(No Model.) 2 Sheets—Sheet 1.
F. H. RICHARDS.
WEIGHING MACHINE.
No. 548,841. Patented Oct. 29, 1895.
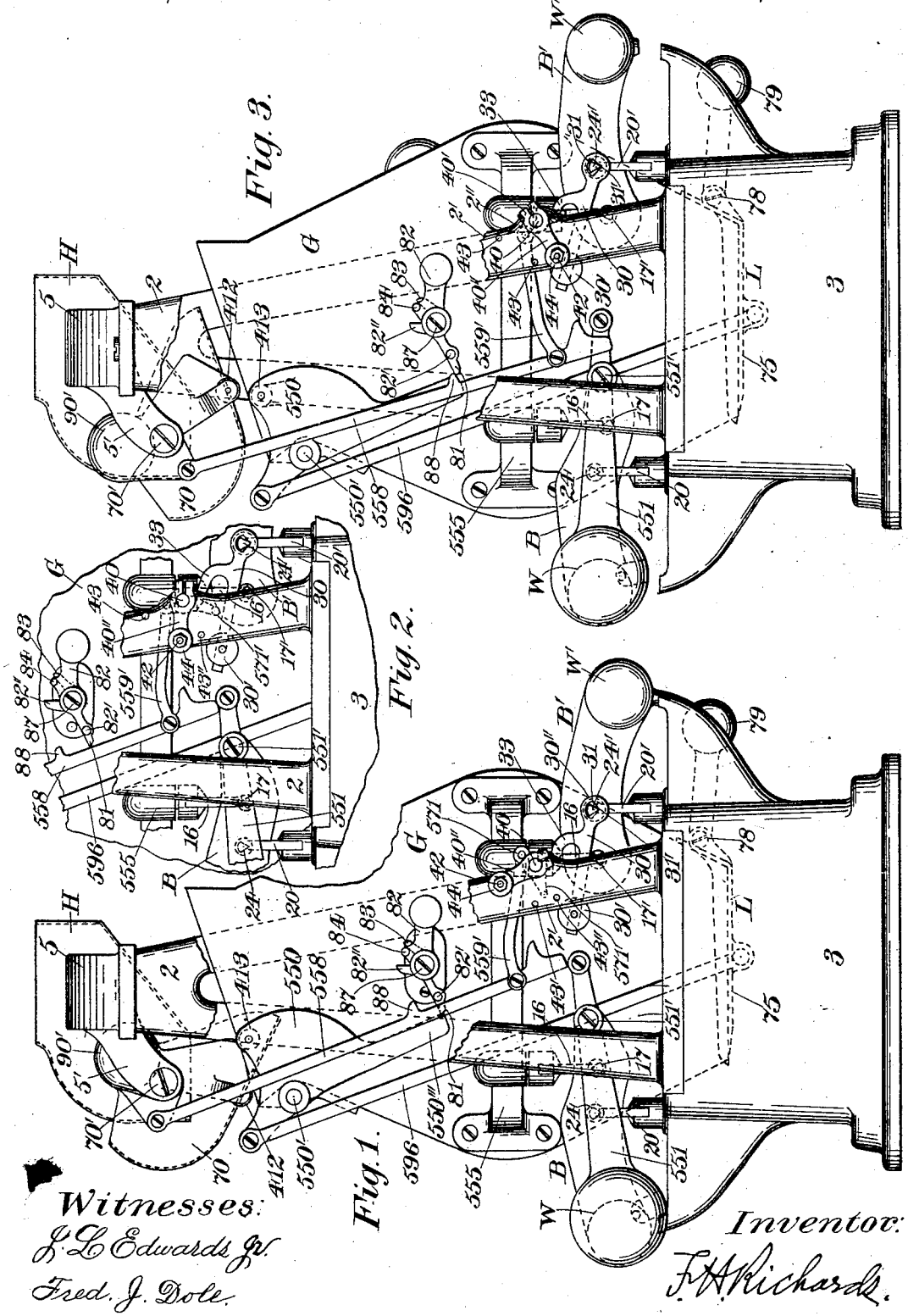
Witnesses:
J. L. Edwards Jr.
Fred. J. Dole.
Inventor:
F. H. Richards.

(No Model.) 2 Sheets—Sheet 2.

F. H. RICHARDS.
WEIGHING MACHINE.

No. 548,841. Patented Oct. 29, 1895.

Witnesses:
J. L. Edwards Jr.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 548,841, dated October 29, 1895.

Application filed May 11, 1895. Serial No. 548,951. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing - machines, the object being to provide a machine of this class having improved testing means whereby the accuracy of a completed load may be readily ascertained.

Figure 6:
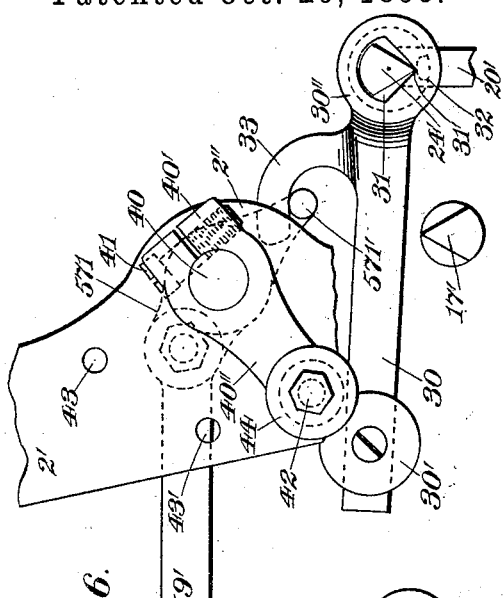
Figure 7:
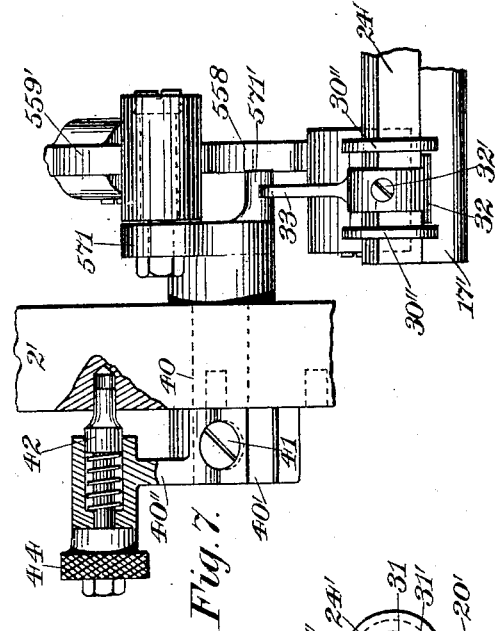
Figure 4:
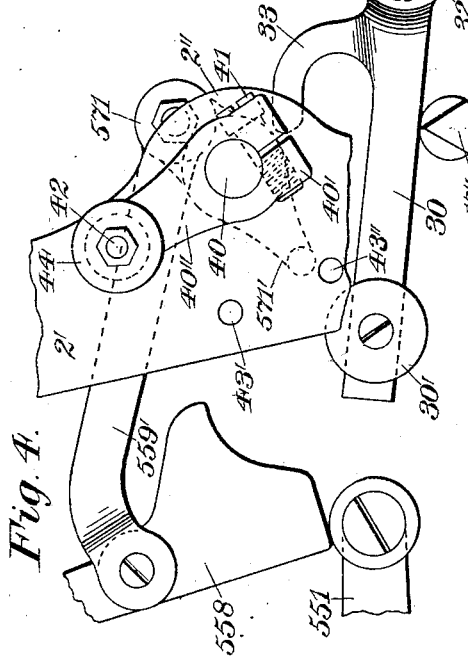
Figure 5:
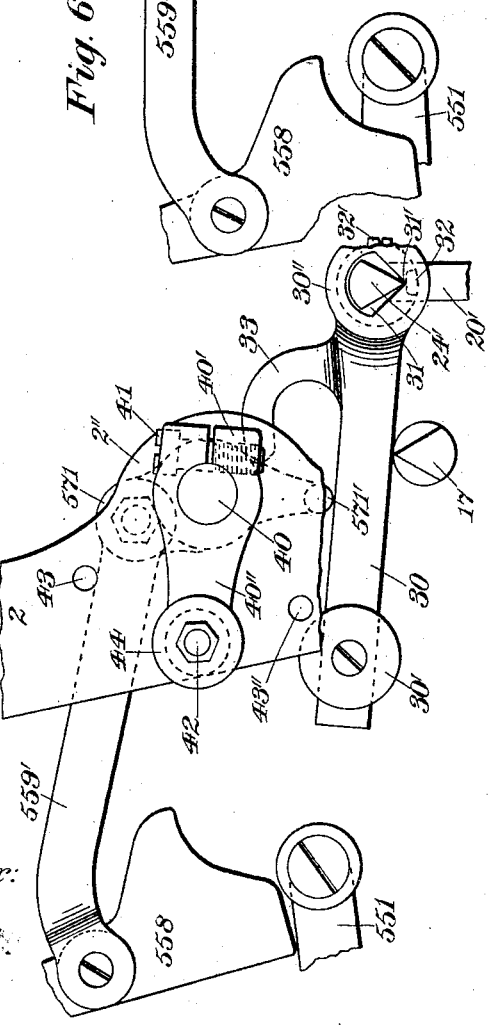

In the drawings accompanying and forming part of this specification, Figure 1 is a left-hand end elevation of a weighing - machine embodying my present improvements and showing a shiftable supplemental balancing means as forming a part of the beam mechanism, the bucket being empty and the valve open for permitting a flow of the material to the bucket. Fig. 2 is a similar view of certain portions of the machine, showing the parts in a preliminary testing position for preventing the discharge of the bucket when the load therein is completed. Fig. 3 is a view similar to Fig. 1 and shows the parts in the subsequent testing position for bringing the mechanism to a poise after the full load is made up. Figs. 4, 5, and 6 are enlarged detail views in end elevation of the supplemental balancing means, showing its connection with the framework onto which it is shiftable when thrown off the beam mechanism, Fig. 4 showing the supplemental balancing means in the position in which the parts are shown in Fig. 1, Fig. 5 showing them in the position in which they are shown as occupying in Fig. 2, and Fig. 6 showing the position of the supplemental balancing means in which it is shown in Fig. 3, in connection with the other parts of the apparatus. Fig. 7 is a front elevation, as seen from the right in Figs. 4, 5, and 6, of the supplemental balancing means and its connection with the frame and beam mechanism and corresponding to Fig. 4, the parts in this view being shown in a position to permit weighing of the material.

Similar characters designate like parts in all the figures of the drawings.

The framework for carrying the operative parts of the machine may be of any suitable construction, and is shown in the drawings as comprising side frames or uprights 2, mounted upon a suitable base 3 and connected by a top plate or beam 5, to which a suitable hopper, such as H, is shown secured in a well-known manner. Only one of the side frames is shown in the drawings, and it is designated by 2.

The base 3 is shown herein as carrying some suitable beam-supports, such as the V-shaped bearings 20 and 20', for supporting the scale-beams which carry the bucket mechanism consisting of the bucket and its operative devices.

As a means for supporting the bucket or load-carrying receptacle, which is designated in a general way by G, a pair of oppositely-disposed counterweighted beams are shown at B and B', respectively. These scale-beams are pivotally mounted on some suitable beam-supports—as, for instance, the pivots or knife-edges 24 and the oppositely-disposed pivots or knife-edges 24'. The scale-beams have bucket-supports located intermediate of said beam-supports and adjacent to corresponding beam - supports, these bucket - supports being shown in the drawings as two remotely-positioned pairs of pivots or knife-edges 17 and 17'. In some cases other well-known kinds of beam-bearings—such as torsion-spring bearings—may be substituted for the knife-edge beam-bearings.

Each of the scale-beams B and B' is shown in the drawings as having a pair of beam-arms joined by a combined connecting-shaft and counterpoise, the counterpoise for the beam B being designated by W and that for beam B' being designated by W'. Each of the scale - beams, therefore, has the usual bucket-poising and bucket - counterpoising portions.

All that portion of the beam mechanism located inside the beam-supports constitutes the bucket-poising portion of the beam mechanism and all that portion of said beam mechanism located outside of said beam-supports constitutes the counterpoising portion of the beam mechanism, and the bucket is illustrated as carried by the poising portion of the beam mechanism. Hence it will be evident that the machine has poising and counterpoising mechanisms and that the bucket mechanism is carried by and forms part of the poising mechanism of the machine.

The bucket or load-carrying receptacle G is pivotally mounted on the oppositely-disposed scale-beams and is shown herein as having V-shaped bearing-faces 16, suitably secured to the bracket or beams 555, and corresponding in number and position with the knife-edges 17 and 17' on each side of the scale-beams.

The bucket mechanism embodies two members, one of which is shiftable relatively to the other for discharging the load, and some suitable load-discharging mechanism in position and adapted for effecting the discharge of the load.

The bucket-closer, which is designated in a general way by L, is shown as consisting of a suitably-formed plate or closer proper, such as 75, having a counterweighted arm 79, preferably formed integrally therewith, the closer being also illustrated as pivoted at 78 to the lower side of the bucket and adjacent to one side of the discharge-opening thereof.

As a means for supporting the closer, an inverted toggle connection is shown in the drawings as connecting the closer and the bucket, and this toggle connection is so positioned as to be engaged by a closer-latch and held at about the angle of repose of the connection when the latch is in its operative position and the closer shut. In the form thereof herein illustrated this toggle comprises some suitable rocker—such, for instance, as 550—pivoted adjacent to the upper rearward side of the bucket, and having a long connecting-rod 596 pivoted to said rocker and also to the closer in such a manner that when the closer is shut the two pivots of said connecting rod or toggle member will be nearly in line with and the upper of said pivots will be above the rocker-pivot, whereby when the rocker is engaged by the bucket-closer latch and held in that position the closer will be supported with a minimum pressure on the latch, as practically all the weight of the bucket contents will be carried on the pivot 550' of the rocker.

The closer-latch for locking the rocker in position when the closer is shut, and which is designated by 82, is shown herein as pivoted at 87 on one end of the bucket and as having a detent or stop 81 in position and adapted for engaging, when the closer is shut, a detent-arm 550''', carried by the rocker.

The bucket-closer latch 82 is shown as counterweighted and as limited in its movements by suitable stops, such as 82'' and 83 on the bucket G, which are so positioned as to engage a stop-arm, such as 84, carried by the latch.

As a means for controlling the stream from the supply-chute, I prefer to employ a valve substantially similar to that described and claimed in my Patent No. 535,627, granted March 12, 1895. I have shown such a valve at 70 as pivoted within arms or brackets 5', depending from the top plate or beam 5, the pivot or axis of movement of the valve being designated by 70'. The valve employed is also illustrated as located substantially beneath the mouth of the supply-chute and as extending beyond the forward edge of said chute sufficiently far to support the descending column or stream when the valve is closed. This valve is also preferably balanced, so as to have normally no tendency either to open or close, the balance-weight being shown herein at 90', extending from opposite ends of the valve-pan.

The rocker 550 and the valve 70 are each shown provided with suitable valve and closer stop-faces, (designated, respectively, by 413 and 412.)

The valve 70 is shown in the drawings as having a connecting rod or arm 558 pivotally secured to the upper rear portion thereof, and as having the lower end of said rod in position and adapted to be engaged by a valve-opening actuator, which will now be described, said actuating-rod 558 being also illustrated as having a pivotal connection, which will be hereinafter referred to, to a fixed portion of the machine.

The connecting-rod 558 is illustrated as constituting the means for transmitting to the valve the valve-opening movement of the valve-actuator, and that valve-actuator which has for its function the operation of opening the valve is shown herein as pivotally mounted on the scale-beam B. In the form thereof herein illustrated the valve-opening actuator consists of a lever 551, pivoted at 551' to the scale-beam B and counterweighted at its rear end.

The connecting-rod 558 has been described as having its lower end in position and adapted to be engaged by a valve-opening actuator, and hence it will be evident that the lever 551 constitutes the means for engaging said rod. When free to actuate the valve for opening the same, this rod 558 forms a part of the actuating means and therefore a part of the valve-opening actuator; but when the opening of the valve is prevented it will also be evident that this rod forms a stop device for limiting or checking the valve-opening movement of the valve-opening actuator.

As a means for discharging the load, a latch-actuator or load-discharger is shown at 88 as carried on the connecting-rod 558, and the closer-latch is also shown as having a stop-arm 82' in position for co-operating with the latch-actuator 88 and adapted to be engaged to release the latch at a predetermined point in the descent of the bucket and the beam.

My improved weighing-machine embodies, in connection with the poising portion of the beam mechanism, a poise-weight, which will be located normally to exert its force on said poising portion, and shifting means for shifting said poise-weight out of action with relation to said poising portion and transferring the effective force thereof onto some fixed part of the machine.

As just stated, my present improvement contemplates the employment of supplemental balancing means or a poising-weight, illustrated as normally carried by the poising portion of the beam mechanism, and normally forming a part thereof, but shiftable out of operative relation therewith and onto a fixed part of the machine, and this additional weight is preferably of a sufficient weight to cause a descent of the bucket just prior to the making up of a full load therein.

It will be understood that when the machine is weighing this supplemental means or poising-weight rests on the beam mechanism and on the poising side thereof. When it is desired to make a test for ascertaining if the bucket is making true and accurate weights, it is only necessary to shift, by means of a rocking or other suitable shifter, the supplemental balancing means or poising-weight out of operative relation with the beam mechanism and the load-discharging or closer-opening mechanism into an inoperative position to prevent the discharge of the load, this being operatively connected with the rocking shifter, and if a true weight has been made up in the bucket it will descend and will be brought to a true poised position.

The supplemental balancing means or poising-weight is herein shown as comprising a relatively-short beam-arm or lever 30, which when performing the function of assisting the descent of the bucket is fulcrumed or supported on a suitable support, herein shown as the knife-edge 17′ of the scale-beam B′. The free end of the relatively-short beam-arm 30 is shown provided with a counterweight 30′, made adjustable thereon to adapt said relatively-short beam-arm 30 to varying conditions. The center of gravity when the weight is in a fixed position relatively to the lever is preferably between the support for said lever and its free end. Said lever or arm 30 is shown provided at the end opposite to that having the counterweight with arms 30″, each having a segmental opening 31, in each of which is formed a V-shaped bearing 31′, each bearing being disposed relatively remote to the other, and each of which is adapted to receive the knife-edge or beam-bearing 24′, which bearing is shown as extending outwardly sufficiently far to hold the two remotely-disposed V-bearings of the two arms 30″ of the scale-beam B′, this knife-edge being employed as a suitable means for carrying the weighted lever 30. The openings 31 are sufficiently large to permit free oscillation of the arm or weighted lever 30 on the said pivot or knife-edge 24′.

Means are provided for preventing lateral displacement or sidewise motion of the supplemental beam-arm 30 and for holding the V-shaped bearings of the arms 30″ truly connecting with the axis of the beam-bearing 24′, said means consisting of a suitable stop device, as the holding-collar 32, interposed between the arms of the supplemental balancing means 30. The stop 32 is held in place by means of a screw or other suitable fastening 32′ passing through said stop device 32 and seated in the knife-edge or beam-bearing 24′.

As heretofore stated, the present improvement embodies a rocking shifter for shifting or throwing the supplemental balancing means out of operative relation with the beam mechanism and lifting it from the poising portion thereof when it is desired to make a test for ascertaining if the machine is weighing properly and for throwing simultaneously therewith the closer-opening mechanism out of operative relation with the closer.

An enlargement 2″ is shown on the portion 2′ of the side frame 2, and there is shown journaled in this enlargement a relatively-short rock-shaft 40, to one side of which is clamped by the clamp 40′ the crank-arm 40″. The clamp 40′ is held in place to the rock-shaft 40 by a suitable screw or other means 41. The opposite end of the relatively-short rock-shaft 40 is shown provided with a crank or link portion 571, which crank portion is shown having formed integral therewith a poising-weight-lifting device, herein illustrated as a beam-engaging arm 571′, for a purpose to be hereinafter described. The supplemental beam-arm 30 is shown provided with a curved upwardly-extending arm 33, to be engaged and raised by the arm 571′ when it is desired to shift said supplemental balancing means from off of the poising portion of the beam mechanism.

The connecting-rod 558 is illustrated as having a pivotal connection by means of a link 559′ to the crank portion 571 of the shifting mechanism. The crank-arm 40″ is shown as having in the handle portion thereof a recess in which works a spring bolt or pin 42 to maintain said bolt in successive positions by placing this in one of the openings 43, 43′, and 43″, formed in the portion 2′ of the side frame 2. The spring-bolt 42 is illustrated as having a thumb-piece 44 for the purpose of withdrawing the spring-bolt from the opening in which it may be seated.

It will be assumed that the parts are in the position shown in Fig. 1 and that the stream is flowing into the bucket G. The bucket, of course, will not descend until the exertion of a force thereon sufficient to counterbalance the counterpoise mechanism. Instead of deferring the descent of the bucket until a given quantity, including the spray, has been received therein, the supplemental balancing means or poising-weight will compensate for this relatively-small portion yet to be projected into the bucket and will cause the descent of the bucket before this is brought to the counterpoising position, the portion of the material necessary to make up a complete load being received subsequently by the bucket on the mass of material already therein.

When the machine is in its ordinary position for weighing, the spring bolt or pin 42 is seated in the uppermost opening or recess 43, formed in the portion 2' of the side frame, as illustrated in Figs. 1, 4, and 7. For making a test to ascertain if the machine is weighing accurately, the thumb-piece 44 is grasped, and by it the spring bolt or pin 42 is withdrawn or disengaged from the uppermost recess or opening 43 and the crank-arm 40'' is turned sufficiently far so that the spring bolt or pin 42 may engage the intermediate recess 43' in the portion 2' of the side frame. The parts are then in the preliminary testing position. (See Figs. 2 and 5.)

Simultaneously with the withdrawal of the spring bolt or pin 42 from the uppermost opening 43 and its turning to engage the second or intermediate recess 43', the connecting-rod 558, by reason of its link connection 559' with the shifting mechanism, is moved or carried laterally, and consequently the latch-actuator 88 thereon is carried out of the path of the stop-arm 82' of the closer-latch. It will be obvious, then, that on the descent of the bucket (the supplemental weight still forming a part of or resting on the beam mechanism) the closer-latch cannot be tripped to open the closer. The bucket will then be permitted to descend to the limit of its range of movement and will remain there, and the connecting-rod 558 will still be in operative relation with the counterpoise-lever 551. To complete the test, the spring bolt or pin 42 is withdrawn from the intermediate or second recess 43' and carried to the third or lower recess 43''. Simultaneously with this operation the connecting-rod 558 is again moved laterally and entirely out of operative relation with the counterpoise-lever 551, carrying, also, the actuator out of operative relation with the shiftable bucket member. Simultaneously with the shifting or carrying of the connecting-rod 558 out of operation relatively with the counterpoise-lever 551, the poising-weight-lifting device or arm 571' of the shifting mechanism is carried under the arm 33 of the supplemental means or poising-weight 30, which operation raises said beam or poising-weight from off of the main beam and at the same time subtracts a like weight from the bucket. If the bucket has received a true load on the subtraction of the added load it will, of course, rise and swing back and forth until it comes to a true poise—that is, until it comes to a rest at the poising-line.

As hereinbefore stated, all those portions of the beam-arms between or intermediate of the beam-bearings or knife-edges constitute the poising portions of these beam-arms, and all those portions beyond or outside of these beam-bearings or knife-edges constitute the counterpoising portions of said beam-arms. It is obvious, then, that each beam-arm having a poising and a counterpoising portion situated, respectively, on opposite sides of its beam-supports or knife-edge, there will be an intermediate non-effective point—that is, the bearing or knife-edge by which each beam-arm is supported. If the supplemental weight or balancing means exerts its power on the poising portion of a beam-arm, this will be effective to carry the bucket down on the completion of a load therein. On the other hand, if this supplemental weight or balancing means, for the purpose of making a test, is shifted by the shifter from the poising side of the beam-arm to bear only on the bearing or knife-edge of this beam-arm, it will be wholly supported by the framework of the machine and will then, it is obvious, be of no effect either as a poising or a counterpoising weight.

By the expression "of a weight approximately equaling the weight of the material necessary to complete a partial bucket-load," as used in the claims is meant that the supplemental weight will be preferably of a weight or mass sufficient to equalize or compensate for a certain small portion of material which is necessary to complete a partial bucket-load, and which is in the air at some point between the valve and the mass already in the bucket at a period subsequent to the cutting off of the stream. The supplemental weight not only compensates for this small portion of material, but also, in practice, for what may be termed a "composite" force consisting of three constituent elements or forces—that is to say, the weight of this small portion of material, its impact downward on the mass already in the bucket, and the momentum of the moving bucket mechanism.

From the preceding description it will be seen that in connection with a bucket mechanism and supporting beam mechanism therefor, said bucket mechanism having two members, one of which is shiftable relatively to the other for discharging the bucket-load, and with a load-discharger for releasing said shiftable member, the supplemental weight is employed for normally exerting its force on one of said mechanisms, and that shifting means are employed for simultaneously throwing the load-discharger into an inoperative position and for shifting said supplemental weight out of its normal position.

Having thus described my invention, I claim—

1. In a weighing-machine, the combination with beam mechanism having a poising portion; of a poise-weight located normally to exert its force on said poising portion; and shifting means for shifting said weight out of action with relation to said poising portion, and transferring the effective force thereof onto a fixed part of the machine, substantially as specified.

2. In a weighing-machine, and in combination with its frame-work; beam mechanism having a poising portion; a poise-weight located normally to exert its force on said poising portion; and shifting means carried by the frame-work for shifting said poise-weight out of action with relation to said poising portion, substantially as specified.

3. In a weighing-machine, the combination with a beam mechanism embodying poising and counterpoising portions; of a bucket supported by the poising portion of the beam mechanism; and a supplemental-weight approximately equaling the weight of the material necessary to complete a partial bucket-load and normally operative during the latter period of the weighing operation, said supplemental-weight also having an arm; and means for engaging said arm for shifting the supplemental-weight out of operative relation with the poising portion of the beam mechanism, substantially as specified.

4. In a weighing-machine, the combination with a pair of oppositely-disposed beams, and with a bucket carried by said beams, and having a closer; of a supplemental-beam normally resting on one of the main-beams; closer-opening mechanism; and shifting means co-operative with said closer-opening mechanism and with the supplemental-beam, for simultaneously throwing said supplemental-beam out of operative relation with said beam mechanism, and said closer-opening mechanism out of operative relation with the closer, substantially as specified.

5. In a weighing-machine, the combination with a pair of oppositely-disposed beams, and with a bucket carried by said beams, and having a closer; of a supplemental-beam normally resting on one of the main-beams, and having an arm; closer-opening mechanism; shifting means for engaging said arm; and a guide connection operatively connecting the closer-opening mechanism with said shifting means, whereby, when the arm on said supplemental-beam is engaged and actuated by the shifting means, said supplemental-beam is thrown out of operative relation with the beam mechanism, and simultaneously therewith, the closer-opening mechanism is thrown out of operative relation with the closer, substantially as described.

6. In a weighing-machine, the combination with a bucket having valve and beam mechanisms; of supplemental balancing means normally carried by the beam mechanism; a closer for the bucket; closer-opening mechanism; and shifting means co-operative with said closer-opening mechanism, and with the supplemental balancing means; and having two movements, one for throwing the closer-opening mechanism out of operative relation with the closer, and the other for shifting the supplemental balancing means out of operative relation with the beam mechanism, substantially as specified.

7. In a weighing-machine, the combination with a bucket having valve and beam mechanisms; of supplemental balancing means normally carried by the poising portion of the beam mechanism; a closer for the bucket; closer-opening mechanism, and shifting means co-operative with the closer-opening mechanism and with the supplemental balancing means for simultaneously shifting said supplemental balancing means out of operative relation with the beam mechanism, and the closer-opening mechanism out of operative relation with the closer, substantially as described.

8. In a weighing-machine, the combination with a scale-beam; of a bucket having two members, one of which is shiftable, relatively to the other, for discharging the load; of a valve for controlling the supply of material to the bucket; and an actuator operative with the valve, and movable in unison with the scale-beam, and having a relatively-rapid descending movement, as compared with that of the bucket, and normally in position and adapted for releasing the shiftable member, at a predetermined point in the descent of the bucket, and by the power of the valve mechanism; a supplemental-beam normally carried by the scale-beam; and means for simultaneously shifting said supplemental-beam out of operative relation with said scale-beam, and said actuator out of operative relation with the shiftable member of the bucket, substantially as described.

9. In a weighing-machine, the combination with a beam mechanism comprising poising and counterpoising portions; of a bucket supported by the poising portion of the beam mechanism; a bearing for the beam mechanism; a supplemental-weight normally supported by the poising portion of the beam mechanism, and of a weight approximately equaling the weight of the material necessary to complete a partial bucket-load, and having said supplemental-weight shiftable from the poising portion of the beam mechanism onto the bearing thereof, to thereby support the supplemental-weight wholly from the beam-bearing, substantially as specified.

10. In a weighing-machine, the combination with a beam mechanism embodying a pivoted beam-arm having poising and counterpoising portions; of a bucket supported from the poising portion of the beam mechanism; a supplemental-weight also supported by the poising portion of the beam mechanism, and of a weight approximately equaling the weight of the material necessary to complete a partial bucket-load, a bearing for said beam-arm; and a shifter in position and adapted for shifting the supplemental-weight from off the poising portion of the beam mechanism and onto the beam-bearing, to thereby wholly support said supplemental-weight from the beam-bearing, substantially as specified.

11. In a weighing-machine, the combination with a bucket and its beam mechanism embodying a beam-arm; a supplemental-weight carried by said beam-arm; a shifter for shifting said supplemental-weight out of operative relation with the beam-arm; and a stop device in position and adapted for limiting the lateral movement of the supplemental-weight, whereby it may be maintained in a position for actuation by the shifter, substantially as specified.

12. In a weighing-machine, the combination with a scale-beam; of a bucket having two members, one of which is shiftable relatively to the other for discharging the load; of a valve for controlling the supply of material to the bucket; and an actuator operative with the valve, and movable in unison with the scale-beam, and having a relatively-rapid descending movement, as compared with that of the bucket, and normally in position and adapted for releasing the shiftable member, at a predetermined point in the descent of the bucket, and by the power of the valve mechanism; a supplemental-weight normally carried by the scale-beam, and supported by the poising portion of said beam; and means for shifting said supplemental-weight out of operative relation with the poising portion of the scale-beam, while permitting it to be carried by the scale-beam, and for shifting said actuator out of operative relation with the shiftable member of the bucket, substantially as described.

13. In a weighing-machine, the combination with a scale-beam embodying a bucket-support and a beam-bearing; of a bucket having two members, one of which is shiftable relatively to the other for discharging the load; of a valve for controlling the supply of material to the bucket; and an actuator operative with the valve, and movable in unison with the scale-beam, and having a relatively-rapid descending movement, as compared with that of the bucket, and normally in position and adapted for releasing the shiftable member, at a predetermined point in the descent of the bucket and by the power of the valve mechanism; a supplemental-weight carried by the beam-bearing, and normally resting on the bucket-support; and a shifter for simultaneously shifting said supplemental-weight from off the bucket-supporting knife-edge and onto the beam-bearing knife-edge, and said actuator out of operative relation with the shiftable member of the bucket, substantially as specified.

14. In a weighing-machine, the combination with a beam mechanism having a beam-arm; a bearing for said beam; of a supplemental poising-weight carried by a lever supported on said bearing; a support for supporting the poising-weight whereby this weight will be normally added to the weight on the beam; a rocking-shifter mounted on the machine free of the beam mechanism; means for setting the rocking-shifter in successive positions; and a poising-weight-lifting device on the shifter in position and adapted for engaging the poising-weight, and lifting the same free of the beam in one position of the shifter, and for standing free of the poising-weight in the other position of the shifter, substantially as specified.

15. In a weighing-machine, the combination with beam mechanism having a scale-beam supported by a knife-edge; of a bucket having two members, one of which is shiftable relatively to the other for discharging the load; a valve for controlling the supply of material to the bucket; an actuator operative with the valve, and movable in unison with the scale-beam, and having a relatively-rapid descending movement as compared with that of the bucket, and normally in position and adapted for releasing the shiftable member at a predetermined point in the descent of the bucket and by the power of the valve mechanism; a poising-weight carried by the scale-beam-supporting knife-edge; a support on said beam-arm for supporting the poising-weight whereby this weight will be normally added to the weight on the beam; a rocking-shifter mounted on the machine free of the beam mechanism; means for setting the rocking-shifter in successive positions; a poising-weight-lifting device on the shifter in position and adapted for engaging the poising-weight, and lifting the same free of the beam-arm in one position of the shifter and for standing free of the poising-weight; a connecting-rod connecting the actuator and the rocking-shifter and in position and adapted for throwing the actuator out of operative relation with the shiftable member of the bucket, when the supplemental poising-weight is raised from off the scale-beam, substantially as specified.

16. In a weighing-machine, the combination with a scale-beam comprising a poising portion, and having a bearing on the poising portion of said scale-beam for supporting a lever; of a lever weighted at its free end, carried by the beam-bearing normally supported by the support on said scale-beam and having its center of gravity between said free end and its support; an arm on said lever, and a shifter in position and adapted for engaging said arm to raise the lever from off the poising portion of the scale-beam, whereby, when said lever is shifted off its support, it will exert an upward pressure against the beam-bearing, and thereby be rendered non-effective as a poising-weight, substantially as specified.

17. In a weighing-machine, the combination with a scale-beam comprising a poising portion, and having a bearing and a support on said poising portion for supporting a lever; of a lever weighted at its free end, carried by the beam-bearing normally supported by the support on said scale-beam, and having its center of gravity between said free end and the support; and a shifter supported by a fixed part of the machine, and in position and adapted for raising said weighted-lever off the poising portion of the scale-beam, whereby said weighted-lever will be rendered non-effective as a poising-weight, substantially as specified.

18. In a weighing-machine, the combination with a beam mechanism embodying a beam-arm having a poising portion and supported by a beam-bearing, and with a bucket mechanism having two members one of which is shiftable relatively to the other for discharging the load; of a valve for controlling the supply of material to the bucket; an actuator operative with the valve, and movable in unison with the beam mechanism, and having a relatively-rapid descending movement as compared with that of the bucket, and normally in position and adapted for releasing the shiftable member at a predetermined point in the descent of the bucket and by the power of the valve mechanism; a weighted-lever carried by the beam-arm-supporting bearing; a support on the beam-arm for normally supporting said weighted-lever; a rocking-shifter mounted on the machine free of the beam mechanism; a lifting device on the shifter for lifting the weighted-lever free of the beam-arm in one position and for standing free of said lever in another position; means for maintaining said rocker in either of said positions; and a connecting-rod for connecting the rocker and said valve-actuator, whereby, when the rocker is rocked, said actuator may be thrown out of operative relation with the shiftable, bucket-discharge member, substantially as specified.

19. In a weighing-machine, the combination with the frame-work and a beam mechanism embodying a beam-arm having a poising portion and supported by a knife-edge; a bucket having two members one of which is shiftable relatively to the other for discharging the load; of a valve for controlling the supply of material to the bucket; an actuator operative with the valve and movable in unison with the beam mechanism, and having a relatively-rapid descending movement as compared with that of the bucket, and normally in position and adapted for releasing the shiftable member at a predetermined point in the descent of the bucket and by the power of the valve mechanism; a weighted-lever carried by the beam-arm-supporting knife-edge; a support on the poising portion of the beam-arm for normally supporting said weighted-lever; a rocking-shifter mounted on the machine free of the beam mechanism; said rocking-shifter comprising a rock-shaft, a crank thereon for rocking said shifter; a lifting device on said rock-shaft for lifting said lever from off the poising portion of the beam and for standing free of said lever in another position; a spring-bolt seated in the crank of said rocking-shifter; recesses in the frame-work adapted for receiving said spring-bolt in one of said positions; and means operatively connecting the actuator and rocking-shifter, whereby when the said shifter is rocked to raise said lever off the beam, the actuator will be thrown out of operative relation with the shiftable bucket-discharge member, substantially as specified.

20. In a weighing-machine, the combination with a scale-beam of the class specified having a knife-edge beam-bearing with an extended knife-edge; an arm having two remotely-disposed bearings adapted to bear on said extended knife-edge; a poising-weight carried by said arm; and a holding-collar fixed on the extended part of said knife-edge between said arm-bearings, whereby the poising-weight is held in place with said bearings truly coinciding with the axis of the beam-bearing, substantially as specified.

21. In a weighing-machine, the combination with a scale-beam having an extended bearing for said beam; of a shiftable lever having a poising-weight on its free end, and at its opposite end two arms each having a bearing supported for oscillation by the extended portion of the beam-bearing, and of a size relatively larger than said beam-bearing for permitting free oscillation of the said lever when said lever is shifted; and a stop device interposed between the arms of said shiftable member, and secured to said beam-bearing for preventing lateral movement of said lever, substantially as specified.

22. In a weighing-machine, the combination with a beam mechanism having poising and counterpoising portions; of bucket mechanism carried by the poising portion of the beam mechanism; and having two members, one of which is shiftable relatively to the other for discharging the load; load discharging mechanism in position and adapted for effecting the discharge of the load; a supplemental-weight located to normally exert its force on the poising portion of the beam mechanism; and shifting means co-operative respectively, with the load-discharging mechanism and with the supplemental-weight, and adapted for simultaneously shifting the supplemental-weight out of operative relation with the poising portion of the beam mechanism, and for shifting the load-discharging mechanism into an inoperative position, substantially as specified.

23. In a weighing-machine, the combination with poising and counterpoising mechanisms; of bucket mechanism carried by, and forming part of, said poising mechanism, and having two members, one of which is shiftable relatively to the other for discharging the bucket load; load-discharging mechanism in position and adapted for effecting the discharge of the load; a supplemental weight located to normally exert its force on said poising mechanism; and shifting means co-operative respectively, with the load-discharging mechanism and with the supplemental weight, and adapted for simultaneously shifting the supplemental weight out of operative relation with said poising mechanism, and for shifting the load-discharging mechanism into an inoperative position, substantially as specified.

24. In a weighing-machine, the combination with bucket mechanism, and supporting beam mechanism therefor, said bucket mechanism embodying two members, one of which is shiftable relatively to the other for discharging the load; of a load-discharger operative for releasing said shiftable member; a supplemental weight located normally to exert its force on one of said mechanisms; and shifting means for simultaneously throwing the load-discharger into an inoperative position, and for shifting said supplemental weight out of its normal position, substantially as specified.

FRANCIS H. RICHARDS.

Witnesses:
 E. G. FOWLER,
 FRED. J. DOLE.